United States Patent
Ando

(10) Patent No.: US 11,717,970 B2
(45) Date of Patent: Aug. 8, 2023

(54) CONTROLLER, CONTROL METHOD USING CONTROLLER, AND CONTROL SYSTEM

(71) Applicant: FANUC CORPORATION, Yamanashi (JP)

(72) Inventor: Toshiyuki Ando, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 429 days.

(21) Appl. No.: 17/073,983

(22) Filed: Oct. 19, 2020

(65) Prior Publication Data
US 2021/0129342 A1  May 6, 2021

(30) Foreign Application Priority Data
Nov. 6, 2019  (JP) ................. 2019-201210

(51) Int. Cl.
| | | |
|---|---|---|
| B25J 9/16 | (2006.01) | |
| B25J 19/02 | (2006.01) | |
| B25J 13/08 | (2006.01) | |
| G06T 7/11 | (2017.01) | |

(Continued)

(52) U.S. Cl.
CPC .......... *B25J 9/1697* (2013.01); *B25J 13/089* (2013.01); *B25J 19/023* (2013.01); *G06T 7/11* (2017.01); *G06T 2207/10024* (2013.01); *G06T 2207/10028* (2013.01)

(58) Field of Classification Search
CPC . G06T 2207/10024; G06T 2207/10028; G06T 7/11; B25J 9/1697; B25J 13/089; B25J 19/023; B25J 9/1602; B25J 15/08; B25J 18/00; G05B 2219/40607
See application file for complete search history.

(56) References Cited

U.S. PATENT DOCUMENTS

| | | | |
|---|---|---|---|
| 10,510,155 B1* | 12/2019 | Islam | .................. G06T 7/70 |
| 10,762,371 B1* | 9/2020 | Walters | ............. G06V 10/507 |
| 2019/0358819 A1* | 11/2019 | Hyuga | ............... G06K 7/1417 |

(Continued)

FOREIGN PATENT DOCUMENTS

| | | |
|---|---|---|
| JP | 2001-268532 | 9/2001 |
| JP | 2007-148663 A | 6/2007 |

(Continued)

*Primary Examiner* — Adam R Mott
*Assistant Examiner* — Heather J Keniry
(74) *Attorney, Agent, or Firm* — Wenderoth, Lind & Ponack, L.L.P.

(57) ABSTRACT

A controller for controlling an operation of a machine or a robot for handling an object by includes: a sensor signal acquisition unit that acquires a signal from a sensor that outputs three-dimensional point cloud data and a corresponding camera image of an imaging subject; a region acquisition unit that acquires a region having a height lower than a predetermined value; a non-object region setting unit that sets, as a non-object region, a region of the camera image corresponding to the acquired region; a complementary color setting unit that sets a color of the non-object region to a color complementary to a color of the object; an object position recognition unit that recognizes a position of the object relative to the imaging subject from the camera image; and an operation control unit that controls the operation of the machine or the robot using at least the recognized position.

6 Claims, 6 Drawing Sheets

(51) Int. Cl.
*B25J 15/08* (2006.01)
*B25J 18/00* (2006.01)

(56) References Cited

U.S. PATENT DOCUMENTS

| | | | |
|---|---|---|---|
| 2020/0213535 A1* | 7/2020 | Benzel | G06T 5/003 |
| 2020/0273138 A1* | 8/2020 | Chavez | G06T 7/73 |
| 2020/0376675 A1* | 12/2020 | Bai | G06T 7/13 |

FOREIGN PATENT DOCUMENTS

| | | | |
|---|---|---|---|
| JP | 2009-85705 | | 4/2009 |
| JP | 2013-184278 A | | 9/2013 |
| JP | 2015-123534 A | | 7/2015 |
| JP | 2018-144144 | | 9/2018 |
| JP | 2019054449 A | * | 4/2019 |
| KR | 2019-0045217 A | * | 9/2017 |

* cited by examiner

MISDETECTION

CONTROLLER, CONTROL METHOD USING CONTROLLER, AND CONTROL SYSTEM

This application is based on and claims the benefit of priority from Japanese Patent Application No. 2019-201210, filed on 6 Nov. 2019, the content of which is incorporated herein by reference.

BACKGROUND OF THE INVENTION

Field of the Invention

The present disclosure relates to a controller, a control method using the controller, and a control system. Particularly, the present disclosure relates to a controller for controlling an operation of a machine or a robot for handling an object by obtaining, through a sensor, three-dimensional point cloud data and a corresponding camera image of the object, a control method using the controller, and a control system.

Related Art

A known robot system distinguishes a workpiece, which is an object of interest, from the background of the workpiece in a camera image and controls operation of a robot based on an image of the distinguished workpiece. For example, Patent Document 1 discloses that three-dimensionally measured data is acquired by performing a three-dimensional measurement on a working space in which workpieces are loaded in bulk, and a workpiece model indicating a shape of the workpiece, except for a background area portion of the workpiece, is created based on the three-dimensionally measured data acquired. Patent Document 1 also discloses that a model coordinate system of the created workpiece model is set, holding data including a holding position of the workpiece model and a posture of a holding unit of a robot is set, setting of a model coordinate system and setting of holding data are repeated while sequentially changing the posture of the workpiece, and multiple pieces of holding data are stored such that the multiple pieces of holding data correspond to the workpiece models, respectively. Patent Document 1 further discloses that a three-dimensional search process is performed with respect to the three-dimensionally measured data obtained by the three-dimensional measurement, and operation of the holding unit of the robot is controlled based on the holding data corresponding to a specific workpiece model.

For another example, Patent Documents 2 and 3 disclose a technique to distinguish an object from the background of the object in a camera image. Patent Document 2 discloses a rangefinder that enables, in generation of a distance image and a luminance image, the luminance image to be generated at high resolution. Specifically, Patent Document 2 discloses that a ranging light irradiation unit irradiates a subject (object of interest) with periodically modulated ranging light, a charge-coupled device (CCD) having a plurality of arrayed light receiving elements receives the ranging light reflected off the subject, and a signal according to the amount of the received light is outputted. Meanwhile, an imaging control unit controls the CCD such that light receiving element groups, each of which includes a predetermined number of the light receiving elements, respectively receive a plurality of phases of reflected light differing from one another in modulation period of the ranging light, and thus signals are obtained for the respective phases. A distance image generation unit calculates a plurality of pieces of distance information indicating distances to the subject on a per-light receiving element group basis based on the signals obtained for the respective phases and generates a distance image having the pieces of distance information as information of pixels. A luminance image generation unit calculates a plurality of pieces of luminance information indicating luminance values of the imaging subject on a per-light receiving element group basis based on the signals obtained for the respective phases and generates a luminance image having the pieces of luminance information as information of the pixels.

Patent Document 3 discloses an image communication device capable of easily switching between subjects located at different focal lengths and transmitting images thereof without the need for complicated operations such as focusing of a camera. Specifically, Patent Document 3 discloses that an image region of a talker is extracted by a luminance region extraction unit from a luminance image based on a distance image obtained by capturing images of a projection pattern projected to the talker using first and second cameras.

Patent Document 1: Japanese Unexamined Patent Application, Publication No. 2018-144144
Patent Document 2: Japanese Unexamined Patent Application, Publication No. 2009-085705
Patent Document 3: Japanese Unexamined Patent Application, Publication No. 2001-268532

SUMMARY OF THE INVENTION

In a case where an object such as a workpiece is on a dirty surface, a controller for controlling an operation of a machine or a robot for handling the object can misrecognize, in an attempt to identify the shape of the object using a camera image, the shape of the object due to an unclear outline of the object resulting from overlapping of a dirty region and a region having the object. Furthermore, in a case where the surface having the object thereon has a mesh pattern, it is difficult to distinguish the object from lines of the mesh pattern in a camera image, and the position of the object can be misrecognized. Furthermore, in a case where the object is black and the surface having the object thereon is blackish, or in a case where the object is white and the surface having the object thereon is whitish, it is difficult to distinguish the object from the surface having the object thereon in a camera image, and the shape of the object can be misrecognized. One possible way to avoid such misrecognition is by setting a high threshold for a search parameter in an object detection function, such as a threshold of a contoured pattern matching degree. However, an overly high threshold makes it difficult to detect the object. Another possible way to avoid such misrecognition is by using an image filter. However, the use of an image filter also affects the image of the object itself. It is therefore desired to clearly distinguish an object from the background of the object in a camera image with a simple constitution or in a simple manner.

(1) A controller according to a first aspect of the present disclosure is a controller for controlling an operation of a machine or a robot for handling an object by recognizing a position of the object. The controller includes:
a sensor signal acquisition unit configured to acquire a signal from a sensor that outputs three-dimensional point cloud data and a corresponding camera image of an imaging subject including the object;

a region acquisition unit configured to acquire a region having a height lower than a predetermined value from the three-dimensional point cloud data of the imaging subject;
a non-object region setting unit configured to set, as a non-object region, a region of the camera image corresponding to the region acquired by the region acquisition unit;
a complementary color setting unit configured to set a color of the non-object region to a color complementary to a color of the object;
an object position recognition unit configured to recognize a position of the object relative to the imaging subject from the camera image in which the color of the region set as the non-object region has been set to the complementary color; and an operation control unit configured to control the operation of the machine or the robot using at least the position recognized by the object position recognition unit.

(2) A control system according to a second aspect of the present disclosure includes:
the controller described in (1);
a machine or a robot whose operation for handling an object is controlled by the controller; and
a sensor configured to output, to the controller, three-dimensional point cloud data and a corresponding camera image of an imaging subject including the object.

(3) A control method according to a third aspect of the present disclosure is a control method using a controller for controlling an operation of a machine or a robot for handling an object by recognizing a position of the object. The control method includes:
acquiring a signal from a sensor that outputs three-dimensional point cloud data and a corresponding camera image of an imaging subject including the object;
acquiring a region having a height lower than a predetermined value from the three-dimensional point cloud data of the imaging subject;
setting, as a non-object region, a region of the camera image corresponding to the region acquired;
setting a color of the non-object region to a color complementary to a color of the object;
recognizing a position of the object from the camera image in which the color of the region set as the non-object region has been set to the complementary color; and
controlling the operation of the machine or the robot using at least the position recognized.

According to the aspects of the present disclosure, it is possible to clearly distinguish an object from the background of the object in a camera image with a simple constitution or in a simple manner.

DETAILED DESCRIPTION OF THE INVENTION

Figure 1:
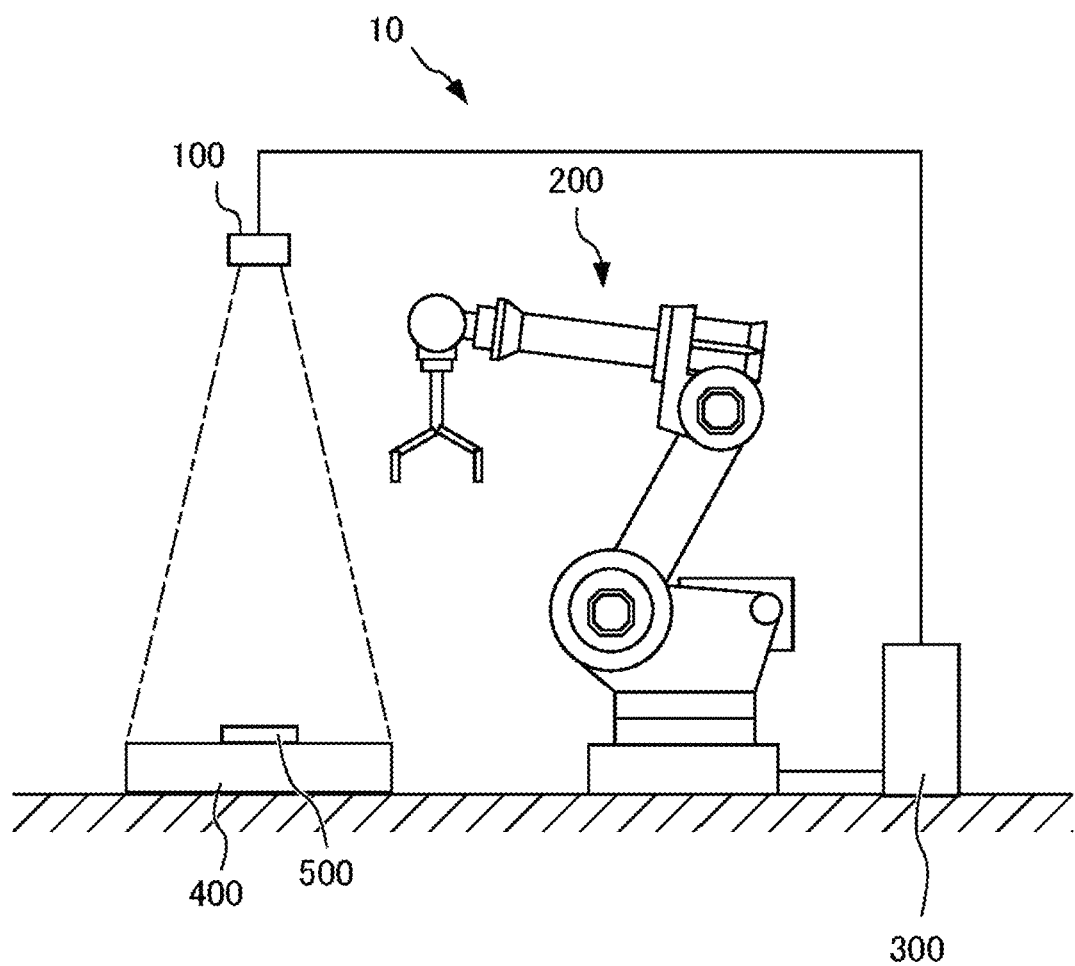
FIG. 1 schematically illustrates an overall constitution of a robot system including a controller according to one embodiment of the present disclosure.
Figure 2:
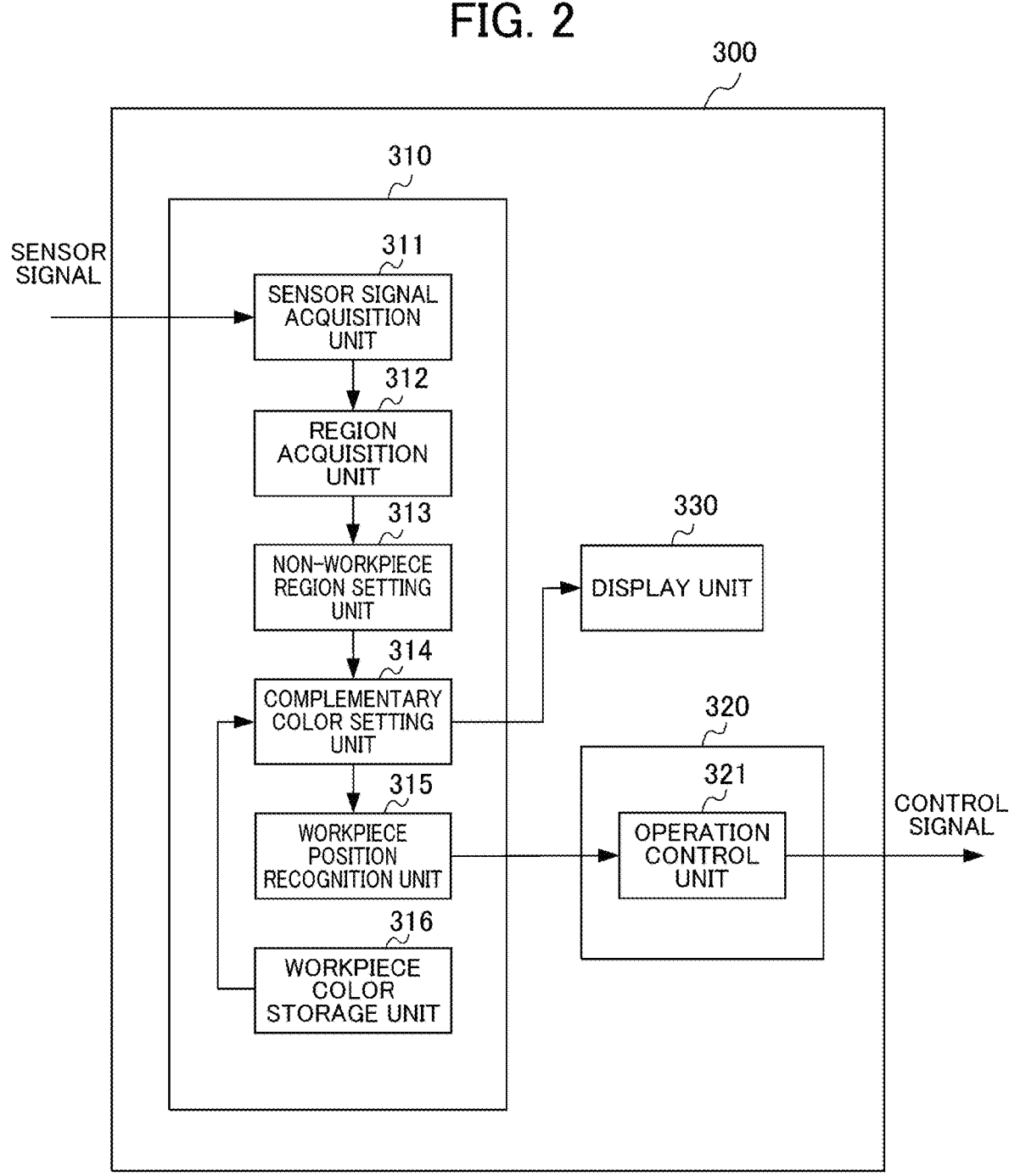
FIG. 2 is a block diagram illustrating a constitution example of the controller.

The following describes embodiments of the present disclosure in detail with reference to the drawings.
FIG. 1 schematically illustrates an overall constitution of a robot system including a controller according to one embodiment of the present disclosure. FIG. 2 is a block diagram illustrating a constitution example of the controller. As illustrated in FIG. 1, a robot system 10 includes a sensor 100 that acquires a three-dimensional point cloud and a two-dimensional camera image of an imaging subject, a robot 200, a controller 300 that controls the robot 200 based on the three-dimensional point cloud and the two-dimensional camera image outputted from the sensor 100, a pallet 400, and a workpiece 500 placed on the pallet 400. The pallet 400 having the workpiece 500 thereon is an imaging subject of a camera image to be captured by the sensor 100. The robot 200 grips and transfers the workpiece 500 with a hand attached to an arm of the robot 200. The workpiece 500 is an object being handled by the robot 200. The controller 300 is communicatively connected to the sensor 100 and the robot 200.

The workpiece 500 may be placed on a conveyor such as a conveyor belt or a work table instead of the pallet 400. No particular limitations are placed on the shape and the like of the workpiece 500 as long as the workpiece 500 is grippable by the hand attached to the arm of the robot 200.

First, an overview of operation of the robot system 10 will be described. The sensor 100 is disposed over the pallet 400 with a specific distance therebetween. The sensor 100 acquires and transmits, to the controller 300, three-dimensional point cloud data and a two-dimensional camera image of the pallet 400 having the workpiece 500 thereon. The two-dimensional camera image may be a color image or a grayscale image. In a case where the workpiece 500 is placed on a conveyor, it is preferable that the three-dimensional point cloud data and the two-dimensional camera image be acquired while the conveyor is temporarily stopped in order to acquire the three-dimensional point cloud data and the two-dimensional camera image at the same time.

The controller 300 acquires a region including three-dimensional points lower than a predetermined level from the three-dimensional point cloud data of the imaging subject, and further acquires a two-dimensional camera image corresponding to the acquired region as a region other than a region having the workpiece 500 (referred to below as a non-workpiece region). The predetermined level may be a preset value or may be determined from a histogram of the three-dimensional point cloud data. The controller 300 then acquires a prestored color of the workpiece 500 and sets a color of the non-workpiece region in the camera image to a color complementary to the color of the workpiece 500. The term "complementary color" as used herein encompasses not only a color on an opposite side of a color circle but also colors near the color on the opposite side, which for example are colors adjacent to the color on the opposite side of the color circle. According to general acceptance, there are no complementary colors in a case where the color of the workpiece 500 is an achromatic color such as white, gray, or black. However, black and white herein are considered complementary colors opposite to each other. It is to be noted that near-black gray is also considered to be complementary to white, and near-white gray is also considered to be complementary to black. Specifically, the color of the non-workpiece region is set to black or near-black gray in a case where the color of the workpiece 500 is white or near-white gray, and the color of the non-workpiece region is set to white or near-white gray in a case where the color of the workpiece 500 is black or near-black gray.

The controller 300 recognizes an outline and a position of the workpiece 500 relative to the pallet 400 from the two-dimensional camera image in which the color of the non-workpiece region has been set to a color complementary to the color of the workpiece 500. The controller 300 also recognizes the height of the workpiece 500 from the three-dimensional point cloud data and sets a level at which the hand of the robot 200 is to grip the workpiece 500.

As described above, the controller 300 sets a non-workpiece region of a two-dimensional camera image from three-dimensional point cloud data of an imaging subject and sets the color of the non-workpiece region to a color complementary to the color of the workpiece 500. As a result, the controller 300 is able to correctly recognize the outline and the position of the workpiece 500 relative to the pallet 400 even if the color of the workpiece 500 and the color of the non-workpiece region are similar or even if the workpiece is on a pallet having a meshed or dirty surface.

The controller 300 recognizes the position of the workpiece 500 relative to the pallet 400 and the level at which the hand of the robot 200 is to grip the workpiece 500, and transmits a control signal for controlling the arm and the hand of the robot 200 to the robot 200. The robot 200 then grips the workpiece 500 with the hand and transfers the workpiece 500 based on the control signal generated by the controller 300.

The constitution described above prevents the robot system 10 from malfunctioning due to the robot system 10 misrecognizing the position of the workpiece 500 on the pallet 400 and the robot 200 failing to grip the workpiece 500. An overview of the overall constitution and the operation of the robot system 10 have been described above. Next, the sensor 100, the robot 200, and the controller 300 included in the robot system 10 will be described in detail.

The sensor 100 acquires a three-dimensional point cloud and a two-dimensional camera image. The sensor includes, for example, two cameras and one projector. The three-dimensional point cloud can be obtained by irradiating the pallet 400 having the workpiece 500 thereon with light having, for example, a stripe or grid pattern emitted from the projector and performing triangulation using images captured by the two cameras. The two-dimensional camera image can be obtained from an image captured by one of the cameras or from images captured by the two cameras. The two-dimensional camera image may be a color image or a grayscale image. The following describes a case where the color of the workpiece 500 is near-black gray or white and the two-dimensional camera image is a grayscale image.

The robot 200 operates based on the control by the controller 300. The robot 200 includes a base that rotates about a vertical axis, the arm that is movable and rotatable, and the hand that is attached to the arm to grip the workpiece 500. The robot 200 drives the arm or the hand in accordance with a control signal outputted by the controller 300, thereby causing the hand to move to a position of the workpiece 500, and grip and transfer the workpiece 500. It is to be noted that the robot 200 is not limited to one that transfers the workpiece 500 and may be one that performs assembly of parts, machining of a workpiece, or the like. A specific constitution of the robot 200 is well known to those skilled in the art. Detailed description thereof will therefore be omitted.

As illustrated in FIG. 2, the controller 300 includes an image processing unit 310, a robot control unit 320, and a display unit 330.

<Image Processing Unit>

The image processing unit 310 includes a sensor signal acquisition unit 311, a region acquisition unit 312, a non-workpiece region setting unit 313, a complementary color setting unit 314, a workpiece position recognition unit 315, and a workpiece color storage unit 316.

The sensor signal acquisition unit 311 acquires, from the sensor 100, a sensor signal including three-dimensional point cloud data and a two-dimensional camera image of the pallet 400 (an imaging subject) having the workpiece 500 thereon, and outputs the sensor signal to the region acquisition unit 312.

Figure 3:
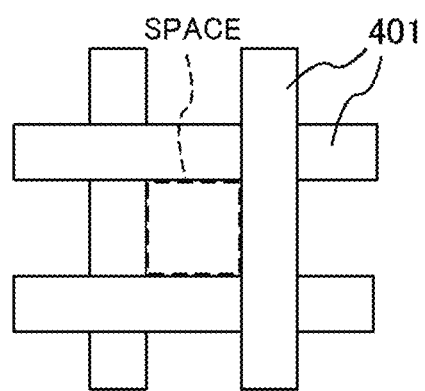
FIG. 3 is a partially enlarged view of a mesh pattern in a portion of a pallet.

The region acquisition unit 312 determines, from the three-dimensional point cloud data of the imaging object, whether or not there is a region higher than a predetermined level, and determines that the pallet 400 has no workpiece 500 thereon upon determining that there is not a region higher than the predetermined level. In a case where a portion of the surface of the pallet 400 has a mesh pattern 401 as illustrated in FIG. 3, the mesh pattern 401 includes a space (a region enclosed by dashed lines in FIG. 3). It is however impossible to acquire three-dimensional point cloud data of this space. The region acquisition unit 312 therefore estimates the height of a portion corresponding to the space based on three-dimensional point cloud data of a surrounding portion. Upon determining that there is a region higher than the predetermined level from the three-dimensional point cloud data, the region acquisition unit 312 acquires a region including three-dimensional points lower than the predetermined level from the three-dimensional point cloud data, and outputs identification information of the region including the three-dimensional points lower than the predetermined level, the two-dimensional camera image, and the three-dimensional point cloud data to the non-workpiece region setting unit 313.

Based on the identification information of the region including the three-dimensional points lower than the predetermined level, the non-workpiece region setting unit 313 sets, as a non-workpiece region, an image region corresponding to the region including the three-dimensional points lower than the predetermined level in the two-dimensional camera image. The non-workpiece region setting unit 313 then outputs identification information of the non-workpiece region, the two-dimensional camera image, and the three-dimensional point cloud data to the complementary color setting unit 314.

The complementary color setting unit 314 acquires the color of the workpiece 500 from the workpiece color storage unit 316 and sets the color of the image region set as the non-workpiece region to a color complementary to the color of the workpiece 500. The color of the workpiece 500 is prestored in the workpiece color storage unit 316.

In a case where the two-dimensional camera image is a grayscale image and the color of the workpiece 500 is near-black gray, for example, the complementary color setting unit 314 sets the color of the non-workpiece region to white. For another example, in a case where the two-dimensional camera image is a grayscale image and the color of the workpiece 500 is white, the complementary color setting unit 314 sets the color of the non-workpiece region to black. The complementary color setting unit 314 may determine the color of the non-workpiece region according to colors in the two-dimensional camera image. In this case, the workpiece color storage unit 316 may be omitted.

Figure 4:
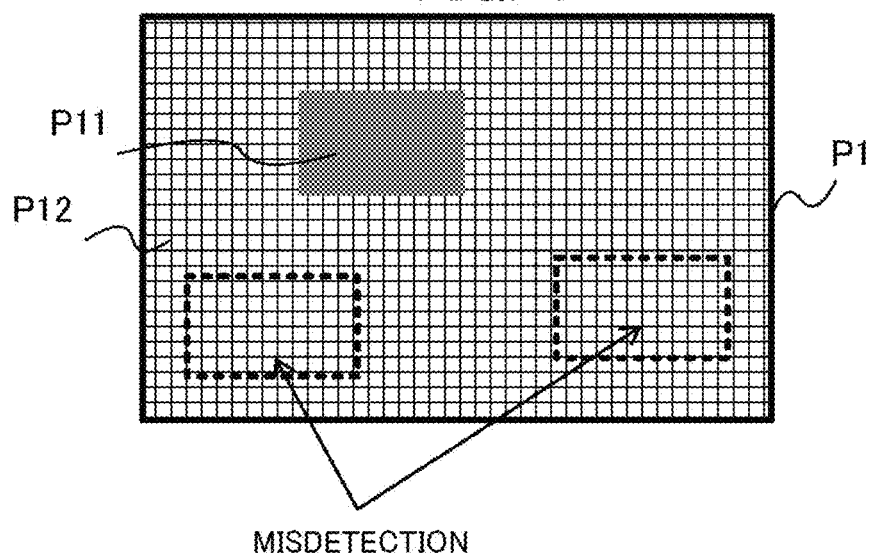
FIG. 4 is an explanatory diagram illustrating a two-dimensional camera image in which the color of a workpiece is near-black gray and a non-workpiece region has a mesh pattern for describing a case where the position of the workpiece is misrecognized.

FIG. 4 is an explanatory diagram illustrating a two-dimensional camera image in which the color of the workpiece is near-black gray and the non-workpiece region has a mesh pattern for describing a case where the position of the workpiece is misrecognized. The pallet 400 has a mesh pattern, and the color of the workpiece 500 is near-black gray. The color of a region (referred to below as a workpiece region) P11 having the workpiece 500 in a two-dimensional camera image P1 illustrated in FIG. 4 is near-black gray, and portions enclosed by dashed lines illustrated in FIG. 4 out of a non-workpiece region P12 indicate regions mistaken as having the workpiece 500. For example, in a case where a portion of the mesh pattern appears dark due to an illumination condition, the portion can be mistaken for a quadrilateral workpiece.

Figure 5:
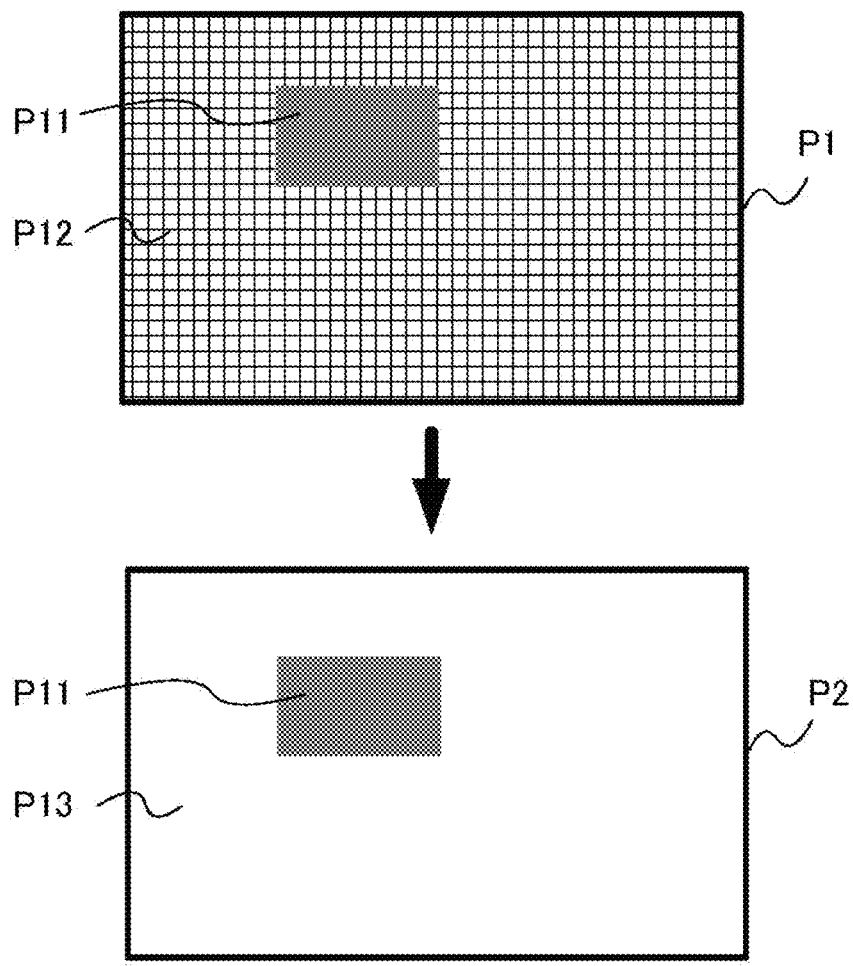
FIG. 5 illustrates two-dimensional camera images for describing a situation in which a complementary color setting unit changes the color of the non-workpiece region in the two-dimensional camera image illustrated in FIG. 4 to white.

FIG. 5 illustrates two-dimensional camera images for describing a situation in which the complementary color setting unit changes the color of the non-workpiece region in the two-dimensional camera image illustrated in FIG. 4 to white. As in the case of FIG. 4, the color of the workpiece region P11 is near-black gray and the non-workpiece region P12 has a mesh pattern in the two-dimensional camera image P1 illustrated in FIG. 5. The complementary color setting unit 314 changes the non-workpiece region P12 having a mesh pattern in the two-dimensional camera image P1 illustrated in FIG. 5 to a white non-workpiece region P13 to generate a two-dimensional camera image P2 illustrated in FIG. 5.

Figure 6:
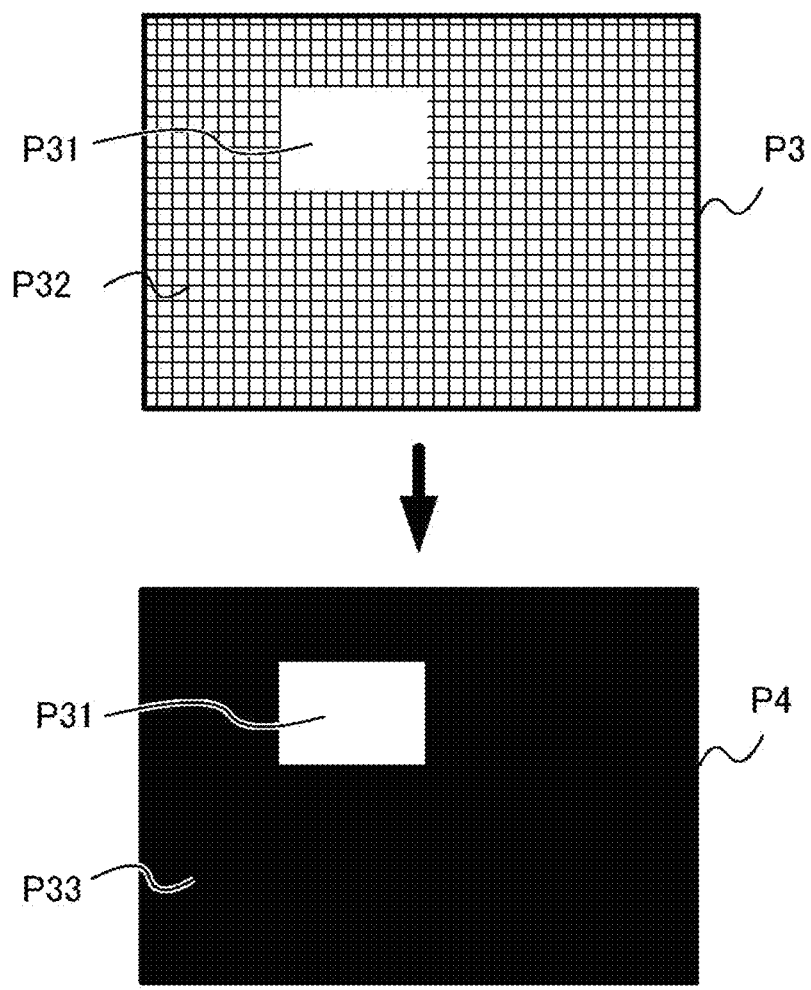
FIG. 6 illustrates two-dimensional camera images for describing a situation in which the complementary color setting unit changes the color of a non-workpiece region to black.

FIG. 6 illustrates two-dimensional camera images for describing a situation in which the complementary color setting unit changes the color of a non-workpiece region to black. In a two-dimensional camera image P3 illustrated in FIG. 6, the color of the workpiece 500 is white, the color of a workpiece region P31 is white, and a non-workpiece region P32 has a mesh pattern.

The complementary color setting unit 314 changes the non-workpiece region P32 having a mesh pattern in the two-dimensional camera image P3 illustrated in FIG. 6 to a black non-workpiece region P33 to generate a two-dimensional camera image P4 illustrated in FIG. 6. The complementary color setting unit 314 outputs, to the workpiece position recognition unit 315, the three-dimensional point cloud data and the two-dimensional camera image in which the color of the image region set as the non-workpiece region has been set to a complementary color. It is to be noted that the complementary color setting unit 314 does not perform any processing using the three-dimensional point cloud data, and therefore the non-workpiece region setting unit 313 may output the three-dimensional point cloud data directly, not via the complementary color setting unit 314, to the workpiece position recognition unit 315 described below.

The workpiece position recognition unit 315 obtains, from the complementary color setting unit 314, the three-dimensional point cloud data and the two-dimensional camera image in which the color of the image region set as the non-workpiece region has been set to a complementary color. The workpiece position recognition unit 315 recognizes the position of the workpiece 500 relative to the pallet 400 from the two-dimensional camera image. The workpiece position recognition unit 315 also recognizes the height of the workpiece 500 from the three-dimensional point cloud data and sets a level at which the hand of the robot 200 is to grip the workpiece 500. The workpiece position recognition unit 315 outputs the position of the workpiece 500 relative to the pallet 400 and the level at which the hand of the robot 200 is to grip the workpiece 500 to an operation control unit 321 of the robot control unit 320.

<Robot Control Unit>

As illustrated in FIG. 2, the robot control unit 320 includes the operation control unit 321. The operation control unit 321 generates a control signal for controlling the arm and the hand of the robot 200, based on the position of the workpiece 500 relative to the pallet 400 and the level at which the hand of the robot 200 is to grip the workpiece 500 outputted from the workpiece position recognition unit 315, and transmits the control signal to the robot 200. It is to be noted that the operation control unit 321 includes an association between a machine coordinate system for controlling the robot 200 and a camera coordinate system for indicating the position of the workpiece 500 by way of calibration that has been preliminarily performed.

<Display Unit>

The display unit 330 displays the two-dimensional camera images P1 and P2 illustrated in FIG. 5, and the two-dimensional camera images P3 and P4 illustrated in FIG. 6 on a screen. The display unit 330 is, for example, a liquid crystal display. A user is able to confirm whether or not the workpiece region has been correctly recognized and the color of the non-workpiece region has been changed to a color complementary to the color of the workpiece 500 by looking at the screen of the display unit 330. The display unit 330 may display only the two-dimensional camera image P2 or the two-dimensional camera image P4 illustrated in FIG. 6 on the screen. In this case, the user is able to confirm whether or not the color of the non-workpiece region is complementary to the color of the workpiece 500. It is to be noted that the display unit 330 may be omitted in a configuration in which the user is not to check the image.

Functional blocks included in the controller 300 have been described above. In order to implement these functional blocks, the controller 300 includes an arithmetic processor such as a central processing unit (CPU). The controller 300 further includes an auxiliary storage device such as a hard disk drive (HDD) storing various control programs like application software and an operating system (OS) and a main storage device such as random access memory (RAM) for storing data transitorily needed when the arithmetic processor executes the programs.

Accordingly, in the controller 300, the arithmetic processor reads the application software and the OS out of the auxiliary storage device, and performs computing based on the application software and the OS while deploying the read application software and the read OS to the main storage device. Based on a result of the computing, the controller 300 controls hardware of various devices. Through the above, the functional blocks according to the present embodiment are implemented. That is, the present embodiment can be implemented through cooperation of hardware and software.

In a specific example, the controller 300 can be implemented by incorporating application software for implementing the present embodiment in a general personal computer or a server device. In a computationally intensive case, the controller 300 can preferably achieve high-speed processing, for example, by incorporating a graphics processing unit (GPU) in a computer and using the GPU for computing through a technique referred to as general-purpose computing on graphics processing units (GPGPU). Alternatively or additionally, high-speed processing is preferably achieved by incorporating a field-programmable gate array (FPGA) in a computer and using the FPGA for computing.

Furthermore, for higher-speed processing, a computer cluster may be built using a plurality of computers each having the GPU and the FPGA, and parallel processing may be performed using the plurality of computers included in the computer cluster.

<Operation of Controller>

Figure 7:
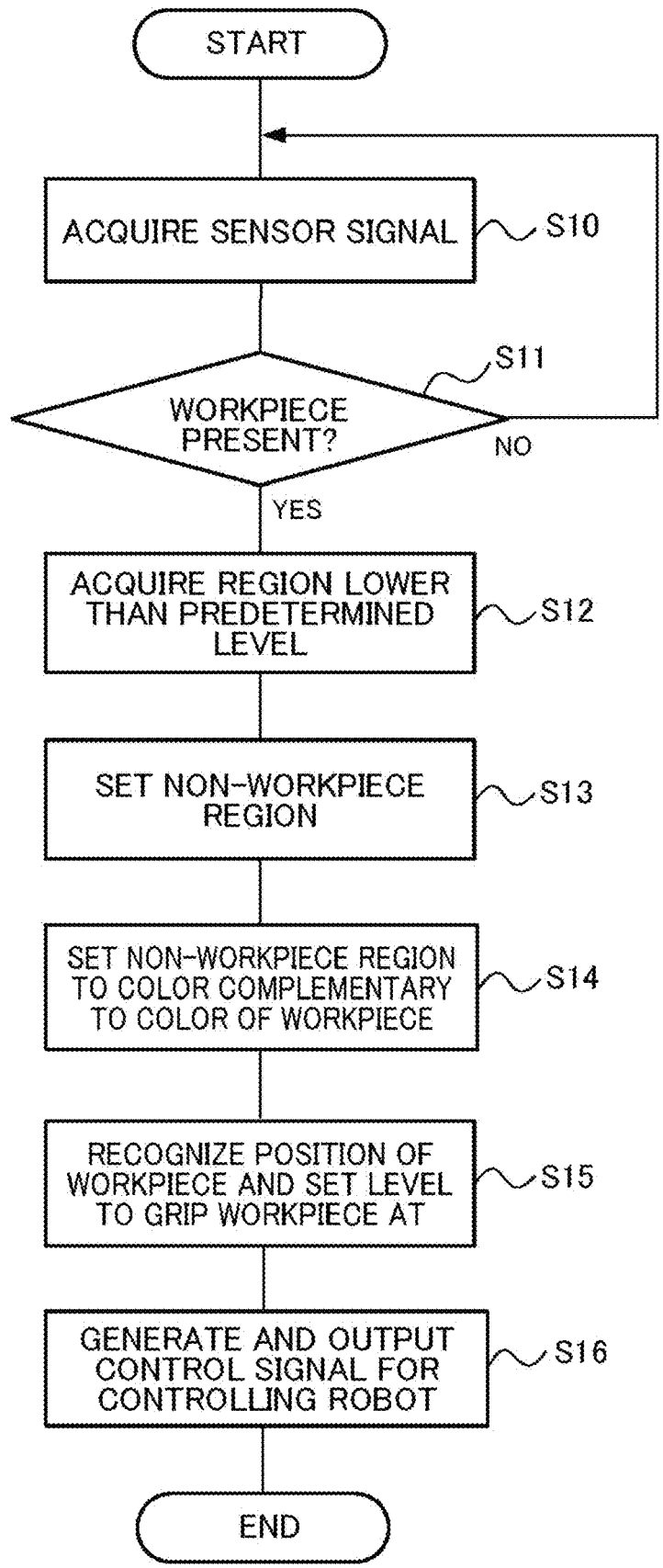
FIG. 7 is a flowchart illustrating operation of the controller according to the present embodiment.

Next, operation of the controller according to the present embodiment will be described with reference to a flowchart in FIG. 7. FIG. 7 is a flowchart illustrating operation of the controller according to the present embodiment.

At step S10, the sensor signal acquisition unit 311 acquires a sensor signal including three-dimensional point cloud data and a two-dimensional camera image from the sensor 100, and outputs the sensor signal to the region acquisition unit 312.

At step S11, the region acquisition unit 312 determines, from the three-dimensional point cloud data, whether or not there is a region higher than the predetermined level. If there is not a region higher than the predetermined level (if NO), the pallet 400 is determined to have no workpiece 500 thereon, and the operation returns to step S10. If it is determined from the three-dimensional point cloud data that there is a region higher than the predetermined level (if YES), the operation advances to step S12.

At step S12, the region acquisition unit 312 acquires a region including three-dimensional points lower than the predetermined level from the three-dimensional point cloud data.

At step S13, the non-workpiece region setting unit 313 sets, as a non-workpiece region, an image region corresponding to the region including the three-dimensional points lower than the predetermined level in the two-dimensional camera image.

At step S14, the complementary color setting unit 314 acquires the color of the workpiece 500 from the workpiece color storage unit 316 and sets the color of the image region set as the non-workpiece region to a color complementary to the color of the workpiece 500.

At step S15, the workpiece position recognition unit 315 recognizes the position of the workpiece 500 relative to the pallet 400 from the two-dimensional camera image in which the color of the image region set as the non-workpiece region has been set to the complementary color, recognizes the height of the workpiece 500 from the three-dimensional point cloud data, and sets a level at which the hand of the robot 200 is to grip the workpiece 500.

At step S16, the operation control unit 321 generates a control signal for controlling the arm and the hand of the robot 200, based on the position of the workpiece 500 relative to the pallet 400 and the level at which the hand of the robot 200 is to grip the workpiece 500, and transmits the control signal to the robot 200.

<Cooperation of Hardware and Software>

It is to be noted that each of the devices included in the robot system described above can be implemented by hardware, software, or a combination thereof. The control method that is carried out through cooperation of the devices included in the robot system described above can also be implemented by hardware, software, or a combination thereof. Being implemented by software herein means being implemented through a computer reading and executing a program.

The program can be supplied to the computer by being stored on any of various types of non-transitory computer readable media. The non-transitory computer readable media include various types of tangible storage media. Examples of the non-transitory computer readable media include magnetic storage media (such as hard disk drives), magneto-optical storage media (such as magneto-optical disks), compact disc read only memory (CD-ROM), compact disc recordable (CD-R), compact disc rewritable (CD-R/W), and semiconductor memory (such as mask ROM, programmable ROM (PROM), erasable PROM (EPROM), flash ROM, and RAM). Alternatively, the program may be supplied to the computer using any of various types of transitory computer readable media.

The embodiments described above are preferred embodiments of the present disclosure. However, the scope of the present disclosure is not limited to the embodiments described above. The embodiments may be combined or modified in a variety of ways to practice the present disclosure without departing from the gist of the present disclosure.

For example, although the image processing unit 310 and the robot control unit 320 constitute a single controller 300 in the embodiments described above, the image processing unit 310 and the robot control unit 320 constituting the controller may be separate devices. In this case, the device constituting the image processing unit 310 and the device constituting the robot control unit 320 may be connected to each other via a network such as a local area network (LAN) or the Internet.

Furthermore, uses of the present disclosure are not particularly limited, although the embodiments are described above using a case where the controller recognizes the position of a workpiece (object being machined) when a robot transfers the workpiece. For example, the present disclosure is applicable to a case where the controller recognizes the position of a workpiece when the workpiece is machined using a machine tool or a case where the controller recognizes the position of a component part on a table when a robot assembles component parts. The term "machines" encompasses not only machine tools but also industrial machines. As such, the control system is not limited to a robot system, and is applicable to a machine tool system or an industrial machine system.

The controller, the control method using the controller, and the control system according to the present disclosure can take various embodiments having the following constitutions including the embodiments described above.

(1) A first aspect of the present disclosure is a controller (for example, the controller 300) for controlling an operation of a machine or a robot for handling an object by recognizing a position of the object. The controller includes:

a sensor signal acquisition unit (for example, the sensor signal acquisition unit 311) configured to acquire a signal from a sensor (for example, the sensor 100) that outputs three-dimensional point cloud data and a corresponding camera image of an imaging subject including the object;

a region acquisition unit (for example, the region acquisition unit 312) configured to acquire a region having a height lower than a predetermined value from the three-dimensional point cloud data of the imaging subject;

a non-object region setting unit (for example, the non-workpiece region setting unit 313) configured to set, as a non-object region, a region of the camera image corresponding to the region acquired by the region acquisition unit;
a complementary color setting unit (for example, the complementary color setting unit 314) configured to set a color of the non-object region to a color complementary to a color of the object;
an object position recognition unit (for example, the workpiece position recognition unit 315) configured to recognize a position of the object relative to the imaging subject from the camera image in which the color of the region set as the non-object region has been set to the complementary color; and
an operation control unit (for example, the operation control unit 321) configured to control the operation of the machine or the robot (for example, the robot 200) using at least the position recognized by the object position recognition unit. The controller according to the first aspect of the present disclosure makes it possible to clearly distinguish an object from the background of the object in a camera image in a simple manner.

(2) In the controller described in (1), the object is an object being machined (for example, the workpiece 500), and the imaging subject is a pallet (for example, the pallet 400) or a conveyor having thereon the object being machined.

(3) In the controller described in (1) or (2), the region acquisition unit estimates a height of a portion of the imaging subject for which the acquisition of three-dimensional point cloud data is unsuccessful, based on three-dimensional point cloud data of a surrounding portion.

(4) The controller described in any one of (1) to (3) further includes a storage unit (for example, the workpiece color storing unit 316) configured to store therein the color of the object. The complementary color setting unit determines the color complementary to the color of the object based on the color of the object stored in the storage unit.

(5) A second aspect of the present disclosure is a control system including:
the controller (for example, the controller 300) described in any one of (1) to (4);
a machine or a robot (for example, the robot 200) whose operation for handling an object is controlled by the controller; and
a sensor (for example, the sensor 100) configured to output, to the controller, three-dimensional point cloud data and a corresponding camera image of an imaging subject including the object. The control system according to the second aspect of the present disclosure makes it possible to clearly distinguish an object from the background of the object in a camera image in a simple manner and to cause a machine or a robot to accurately perform an operation on the object.

(6) A third aspect of the present disclosure is a control method using a controller (for example, the controller 300) for controlling an operation of a machine or a robot for handling an object by recognizing a position of the object. The control method includes:
acquiring a signal from a sensor (for example, the sensor 100) that outputs three-dimensional point cloud data and a corresponding camera image of an imaging subject including the object;
acquiring a region having a height lower than a predetermined value from the three-dimensional point cloud data of the imaging subject;
setting, as a non-object region, a region of the camera image corresponding to the region acquired;
setting a color of the non-object region to a color complementary to a color of the object;
recognizing a position of the object from the camera image in which the color of the region set as the non-object region has been set to the complementary color; and
controlling the operation of the machine or the robot (for example, the robot 200) using at least the position recognized. The control method according to the third aspect of the present disclosure makes it possible to clearly distinguish an object from the background of the object in a camera image in a simple manner.

EXPLANATION OF REFERENCE NUMERALS

10: Robot system
100: Sensor
200: Robot
300: Controller
310: Image processing unit
311: Sensor signal acquisition unit
312: Region acquisition unit
313: Non-workpiece region setting unit
314: Complementary color setting unit
315: Workpiece position recognition unit
316: Workpiece color storage unit
320: Robot control unit
321: Operation control unit
330: Display unit
400: Pallet
500: Workpiece (object)

What is claimed is:

1. A controller for controlling an operation of a machine or a robot for handling an object by recognizing a position of the object, the controller comprising:
a memory configured to store a program; and
a processor configured to execute the program and control the controller to:
acquire a signal from a sensor that outputs three-dimensional point cloud data and that also outputs a corresponding camera image of an imaging subject on which the object may be placed;
determine from the three-dimensional point cloud data of the imaging subject that an object is present on the imaging subject by determining that there is a region having a height higher than a predetermined value and acquire a region having a height lower than the predetermined value from the three-dimensional point cloud data of the imaging subject;
set, as a non-object region, a region of the camera image corresponding to the region acquired;
set a color of the non-object region to a color complementary to a color of the object;
recognize a position of the object relative to the imaging subject from the camera image in which the color of the region set as the non-object region has been set to the complementary color;
recognize a height of the object from the three-dimensional point cloud data, and set a level at which the robot is to grip the object; and
control the operation of the machine or the robot using at least the position and the height recognized.

2. The controller according to claim 1, wherein the object is an object being machined, and the imaging subject is a pallet or a conveyor having thereon the object being machined.

3. The controller according to claim 1, wherein the processor is further configured to execute the program and control the controller to estimate a height of a portion of the imaging subject for which the acquisition of three-dimensional point cloud data is unsuccessful, based on three-dimensional point cloud data of a surrounding portion.

4. The controller according to claim 1, further comprising a second memory configured to store therein the color of the object, wherein
the processor is further configured to execute the program and control the controller to determine the color complementary to the color of the object based on the color of the object stored in the second memory.

5. A control system comprising:
the controller according to claim 1;
a machine or a robot whose operation for handling an object is controlled by the controller; and
a sensor configured to output, to the controller, three-dimensional point cloud data and a corresponding camera image of an imaging subject including the object.

6. A control method executed by a controller including a memory configured to store a program and a processor for controlling an operation of a machine or a robot for handling an object by recognizing a position of the object, the processor executing the program to perform operations of the control method comprising:
acquiring a signal from a sensor that outputs three-dimensional point cloud data and that also outputs a corresponding camera image of an imaging subject on which the object may be placed;
determining from the three-dimensional point cloud data of the imaging subject that an object is present on the imaging subject by determining that there is a region having a height higher than a predetermined value and acquiring a region having a height lower than the predetermined value from the three-dimensional point cloud data of the imaging subject;
setting, as a non-object region, a region of the camera image corresponding to the region acquired;
setting a color of the non-object region to a color complementary to a color of the object;
recognizing a position of the object from the camera image in which the color of the region set as the non-object region has been set to the complementary color;
recognizing a height of the object from the three-dimensional point cloud data, and set a level at which the robot is to grip the object; and
controlling the operation of the machine or the robot using at least the position and the height recognized.

* * * * *